(12) United States Patent
Huang

(10) Patent No.: US 10,817,702 B2
(45) Date of Patent: Oct. 27, 2020

(54) METHOD, TERMINAL, AND COMPUTER-READABLE STORAGE MEDIUM FOR PROCESSING FINGERPRINT

(71) Applicant: BEIJING XIAOMI MOBILE SOFTWARE CO., LTD., Beijing (CN)

(72) Inventor: Xuebin Huang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 106 days.

(21) Appl. No.: 16/102,073

(22) Filed: Aug. 13, 2018

(65) Prior Publication Data

US 2019/0095690 A1     Mar. 28, 2019

(30) Foreign Application Priority Data

Sep. 22, 2017  (CN) .......................... 2017 1 0866372

(51) Int. Cl.
*G06K 9/00*     (2006.01)
*G06F 21/32*    (2013.01)

(52) U.S. Cl.
CPC ......... *G06K 9/00087* (2013.01); *G06F 21/32* (2013.01); *G06K 9/00926* (2013.01)

(58) Field of Classification Search
CPC . G06K 9/00087; G06K 9/00926; G06F 21/32

(Continued)

(56) References Cited

U.S. PATENT DOCUMENTS 10,223,574 B2 *   3/2019   Zhou .................. G06K 9/00006
10,460,149 B2 *  10/2019   Zhang ................ G06K 9/00087
(Continued)

FOREIGN PATENT DOCUMENTS

CN       102254167 A     11/2011
CN       105389566 A      3/2016
(Continued)

OTHER PUBLICATIONS

Extended European search report issued in corresponding European Application No. 18196083.2, dated Feb. 19, 2019, 8 pages.

(Continued)

*Primary Examiner* — Daniel G Mariam
(74) *Attorney, Agent, or Firm* — Arch & Lake LLP

(57) ABSTRACT

Methods and devices are provided for processing fingerprint. The method may include: acquiring currently input first fingerprint information by a fingerprint detection component when a verification trigger event corresponding to a preset action is detected; adding the first fingerprint information to a fingerprint template library as an unmatched type of fingerprint template when there is no fingerprint template whose matching degree with the first fingerprint information is greater than a first preset threshold in the fingerprint template library and there is a fingerprint template whose matching degree with the first fingerprint information is greater than a second preset threshold in fingerprint template library, wherein the fingerprint template library comprises at least two types of fingerprint templates; and performing the preset action when there is a fingerprint template whose matching degree with the first fingerprint information is greater than the first preset threshold in the fingerprint template library.

20 Claims, 5 Drawing Sheets

(58) Field of Classification Search
USPC .................................. 382/124, 125, 209, 218
See application file for complete search history.

(56) References Cited

U.S. PATENT DOCUMENTS

| | | | |
|---|---|---|---|
| 2014/0003681 | A1 | 1/2014 | Wright et al. |
| 2016/0125223 | A1* | 5/2016 | Boshra ............... G06K 9/00087 382/124 |
| 2017/0004295 | A1* | 1/2017 | Kim ........................ G06F 21/32 |
| 2018/0089520 | A1* | 3/2018 | Li ....................... G06K 9/00087 |
| 2018/0150679 | A1* | 5/2018 | Kim ................... G06K 9/00087 |
| 2018/0211093 | A1* | 7/2018 | Bae ........................ G06K 9/522 |

FOREIGN PATENT DOCUMENTS

| | | |
|---|---|---|
| CN | 105678238 A | 6/2016 |
| CN | 106372609 A | 2/2017 |
| EP | 3229176 A1 | 10/2017 |
| WO | 2017080291 A1 | 5/2017 |

OTHER PUBLICATIONS

Biagio Freni et al: "Replacement Algorithms for Fingerprint Template Update", Image Analysis and Recognition, Springer-Verlag Berlin Heidelberg 2008, vol. 5112, Jun. 25, 2008, pp. 884-893.
First Office Action of Chinese Application No. 201710866372.6 dated Sep. 10, 2019, with English translation, (16p).

\* cited by examiner

METHOD, TERMINAL, AND COMPUTER-READABLE STORAGE MEDIUM FOR PROCESSING FINGERPRINT

CROSS-REFERENCE TO RELATED APPLICATION

This application is based on and claims priority to Chinese Patent Application No. 201710866372.6 filed on Sep. 22, 2017, the entire contents of which are incorporated herein by reference.

TECHNICAL FIELD

This disclosure relates to the field of electronic technology, and more particularly to a method, a terminal and a computer-readable storage medium for processing fingerprint.

BACKGROUND

With the development of electronic technology and Internet technology, terminals such as mobile phones and computers have been widely used, and functions of corresponding terminals have become more and more abundant. For example, fingerprint identification function is a commonly used function. The terminal's screen can be unlocked through the fingerprint identification function.

Specifically, a user may pre-record fingerprint information, and the terminal may store the recorded fingerprint information as a fingerprint template in a fingerprint template library. When the terminal is used, the terminal may acquire the fingerprint information of the user and determine whether the acquired fingerprint information matches the fingerprint template in the fingerprint template library. If they match, the terminal may perform a screen unlocking process. Otherwise, the terminal may not perform the screen unlocking process.

During the implementation of the present disclosure, the inventors found at least the following problems:

Based on the above processing method, when the fingerprint information input by the user is acquired, the terminal will only compare the same with the pre-recorded fingerprint template. If the pre-recorded fingerprint template contains only partial fingerprint information of a finger and the user inputs another partial fingerprint information of the finger when unlocking the screen, the terminal will determine that the fingerprint information input does not match the fingerprint template based on the above processing method and will not perform the screen unlocking process, resulting in processing failure.

SUMMARY

In order to overcome the problem of processing failure in the related art, the present disclosure provides a method, a terminal and a computer-readable storage medium for processing fingerprint. The technical solutions are as follows:

According to a first aspect of the present disclosure, there is provided a method for processing fingerprint. The method includes: acquiring currently input first fingerprint information by a fingerprint detection component when a verification trigger event corresponding to a preset action is detected; adding the first fingerprint information to a fingerprint template library as an unmatched type of fingerprint template when there is no fingerprint template whose matching degree with the first fingerprint information is greater than a first preset threshold in the fingerprint template library and there is a fingerprint template whose matching degree with the first fingerprint information is greater than a second preset threshold in fingerprint template library, where the fingerprint template library comprises at least two types of fingerprint templates and the first preset threshold is greater than the second preset threshold; and performing the preset action when there is a fingerprint template whose matching degree with the first fingerprint information is greater than the first preset threshold in the fingerprint template library.

According to a second aspect of the present disclosure, there is provided an apparatus for processing fingerprint. The apparatus includes: an acquisition module configured to acquire currently input first fingerprint information by a fingerprint detection component when a verification trigger event corresponding to a preset action is detected; a first addition module configured to add the first fingerprint information to a fingerprint template library as an unmatched type of fingerprint template when there is no fingerprint template whose matching degree with the first fingerprint information is greater than a first preset threshold in the fingerprint template library and there is a fingerprint template whose matching degree with the first fingerprint information is greater than a second preset threshold in fingerprint template library, where the fingerprint template library comprises at least two types of fingerprint templates and the first preset threshold is greater than the second preset threshold; and a performing module configured to perform the preset action when there is a fingerprint template whose matching degree with the first fingerprint information is greater than the first preset threshold in the fingerprint template library.

According to a third aspect of the present disclosure, there is provided a terminal. The terminal includes a processor; and a memory configured to store executable instructions executed by the processor. The processor is configured to: acquire currently input first fingerprint information by a fingerprint detection component when a verification trigger event corresponding to a preset action is detected; add the first fingerprint information to a fingerprint template library as an unmatched type of fingerprint template when there is no fingerprint template whose matching degree with the first fingerprint information is greater than a first preset threshold in the fingerprint template library and there is a fingerprint template whose matching degree with the first fingerprint information is greater than a second preset threshold in fingerprint template library, where the fingerprint template library comprises at least two types of fingerprint templates and the first preset threshold is greater than the second preset threshold; and perform the preset action when there is a fingerprint template whose matching degree with the first fingerprint information is greater than the first preset threshold in the fingerprint template library.

According to a fourth aspect of the present disclosure, there is provided a computer-readable storage medium. The storage medium includes at least an instruction, a program, a code set or instruction set loaded and executed by a processor to implement: acquiring currently input first fingerprint information by a fingerprint detection component when a verification trigger event corresponding to a preset action is detected; adding the first fingerprint information to a fingerprint template library as an unmatched type of fingerprint template when there is no fingerprint template whose matching degree with the first fingerprint information is greater than a first preset threshold in the fingerprint template library and there is a fingerprint template whose matching degree with the first fingerprint information is greater than a second preset threshold in fingerprint template library, where the fingerprint template library comprises at least two types of fingerprint templates and the first preset threshold is greater than the second preset threshold; and performing the preset action when there is a fingerprint template whose matching degree with the first fingerprint information is greater than the first preset threshold in the fingerprint template library.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the present disclosure. In the drawings.

The embodiments of the present disclosure are illustrated openly and clearly in the above figures, and are described in more detail subsequently. The figures and description are not intended to limit the scope of the present disclosure by any means, but rather to describe concept of the present disclosure for those skilled in the art by referring to the specific embodiments.

DETAILED DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

An aspect of the disclosure of the present disclosure provides a method for processing fingerprint, which may be implemented by a terminal. The terminal may be a terminal with a fingerprint identification function, such as a mobile phone, a tablet computer and other mobile terminals with a fingerprint identification function. The terminal may include components such as a processor, a memory, a fingerprint detection component, and the like. The processor may be a central processing unit (CPU) or the like that can be used to determine whether first fingerprint information acquired matches up with a fingerprint template in a fingerprint template library, to perform the preset action and the like. The memory can be a RAM (Random Access Memory), a Flash (flash memory), etc., which can be used for storing received data, data required for processing, data generated during processing, and the like, such as fingerprint templates. The fingerprint detection component can be used to acquire fingerprint information input by a user.

Figure 1:
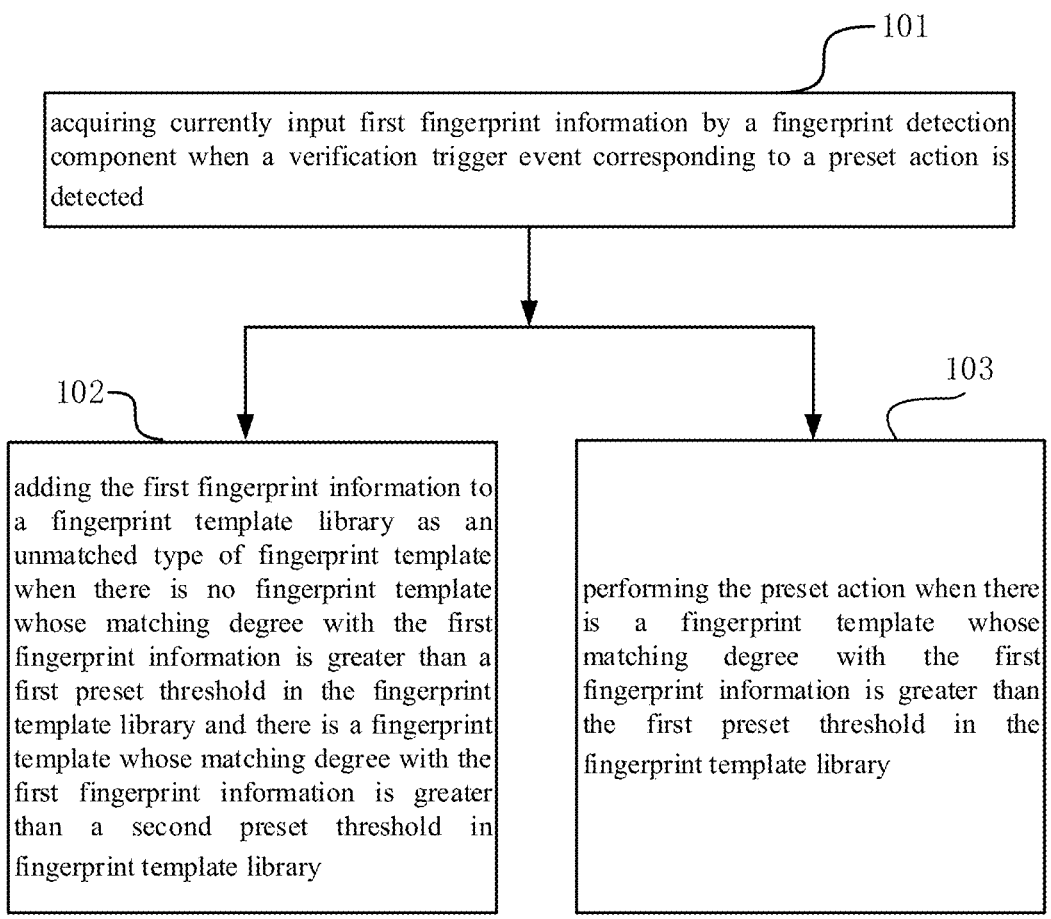
FIG. 1 is a flow chart of a method for processing fingerprint shown in accordance with an aspect of the disclosure.

The processing flow shown in FIG. 1 will be described in detail hereinafter in combination with embodiments as follows:

In step 101, when a verification trigger event corresponding to a preset action is detected, a fingerprint detection component acquires currently input first fingerprint information.

The preset action may include any action or function that can be performed on the terminal, and may be a screen unlocking process, an application unlocking process, a payment confirmation processing of a payment-type application, and the like. The verification trigger event may be an event that triggers a fingerprint verification process corresponding to the preset action. For example, the verification trigger event may be an event of the terminal being switched from a screen-off state to displaying a screen locking interface or an event of touching the fingerprint detection component in a screen-locked state. As another example, in the case where a fingerprint identification key is provided on the screen locking interface of the terminal, the verification trigger event may be an event that the user clicks on the identification key.

In an implementation, a verification trigger event corresponding to the preset action may be preset in the terminal. During the use of the terminal, whenever the user wants to trigger the terminal to perform the preset action, the terminal may be triggered to detect the occurrence of the verification trigger event corresponding to the preset action through operation. In this case, the terminal may start a fingerprint verification process, that is, the fingerprint detection component acquires the currently input fingerprint information (which may be referred to as the first fingerprint information).

In some embodiments, the preset action may be include screen unlocking process.

In an implementation, when the user wants to use the terminal when the terminal is in the screen-locked state, the terminal may be triggered to perform the screen unlocking process through operation. The verification trigger event corresponding to the screen unlocking process preset in the terminal may be an event of touching the fingerprint detection component in the screen-locked state. Specifically, the user may touch the fingerprint detection component with a finger. Here, the terminal detects the verification trigger event corresponding to the screen unlocking process, thereby acquiring the first fingerprint information currently input by the user by the fingerprint detection component.

In step 102, when there is no fingerprint template whose matching degree with the first fingerprint information is greater than a first preset threshold in the fingerprint template library, and there is a fingerprint template whose matching degree with the first fingerprint information is greater than a second preset threshold in the fingerprint template library, the first fingerprint information is added to the fingerprint template library as an unmatched type of fingerprint template.

In an implementation, the fingerprint template library corresponding to the fingerprint detection component may include a plurality of fingerprint templates. The fingerprint templates may include a pre-recorded fingerprint template, which may be referred to as a matched type of fingerprint template). The fingerprint templates may also include an unmatched type of fingerprint template added in the identification process (the specific adding method will be described in detail later). The fingerprint template library includes at least two types of fingerprint templates. In addition, in some cases, the terminal may convert the unmatched type of fingerprint template into a matched type of fingerprint template. In this case, the fingerprint templates in the fingerprint template library may include a pre-recorded fingerprint template, an unmatched type of fingerprint template added in the identification process, and a matched type of fingerprint template converted from the unmatched type of fingerprint template.

After acquiring the first fingerprint information, the terminal may calculate a matching degree (or coincidence degree) between the first fingerprint information and each fingerprint template in the fingerprint template library to compare each calculated matching degree with the first preset threshold. When the matching degrees between the first fingerprint information and all the fingerprint templates in the fingerprint template library are less than the first preset threshold, that is, there is no fingerprint template whose matching degree with the first fingerprint information is greater than the first preset threshold in the fingerprint template library, the terminal may further determine whether there is any fingerprint template whose matching degree with the first fingerprint information is greater than the second preset threshold (which may be referred to as a first fingerprint template) among all the fingerprint templates. The first fingerprint template may be any template in the fingerprint template library, i.e., any template among the pre-recorded fingerprint templates, the unmatched type of fingerprint templates added during the identification process, and the matched type of fingerprint templates converted from the unmatched type of fingerprint templates.

When there is a first fingerprint template whose matching degree with the first fingerprint information is greater than the second preset threshold in the fingerprint template library, the terminal may add the first fingerprint information to the fingerprint template library as an unmatched type of fingerprint template (this situation shows that the first fingerprint information is indeed the fingerprint information of the finger corresponding to the pre-recorded fingerprint template, while the first fingerprint information and the prerecorded fingerprint template contain different fingerprint information). Otherwise, the terminal can discard the fingerprint information (this situation shows that the first fingerprint information is not the fingerprint information of the finger corresponding to the prerecorded fingerprint template, that is, the finger corresponding to the first fingerprint information is different from the finger corresponding to the prerecorded fingerprint template). The first preset threshold is greater than the second preset threshold.

In some embodiments, the number of fingerprint templates that can be stored in the fingerprint template library is limited. An unmatched type of fingerprint template may be added to the fingerprint template library when the fingerprint template library is not full. Accordingly, the processing flow of step 102 may be as follows: when there is no fingerprint template whose matching degree with the first fingerprint information is greater than the first preset threshold in the fingerprint template library, there is a fingerprint template whose matching degree with the first fingerprint information in the fingerprint template library is greater than the second preset threshold, and the number of fingerprint templates in the fingerprint template library is less than a preset threshold number, the first fingerprint information is added to the fingerprint template library as an unmatched type of fingerprint template.

In an implementation, when there is no fingerprint template whose matching degree with the first fingerprint information is greater than the first preset threshold in the fingerprint template library, and there is a fingerprint template whose matching degree with the first fingerprint information is greater than the second preset threshold in the fingerprint template library, the terminal may further determine whether the number of fingerprint templates contained in the fingerprint template library is less than the preset threshold number. When the number of fingerprint templates in the fingerprint template library is less than the preset threshold number, the terminal may directly add the first fingerprint information to the fingerprint template library as an unmatched type of fingerprint template.

In some embodiments, when the fingerprint template library is full, the processing procedure in step 102 may be as follows: when there is no fingerprint template whose matching degree with the first fingerprint information is greater than the first preset threshold in the fingerprint template library, there is a fingerprint template whose matching degree is greater than the second preset threshold in the fingerprint template library, and the number of fingerprint templates in the fingerprint template library reaches the preset threshold number, the earliest added unmatched type of fingerprint template in the fingerprint template library is deleted and the first fingerprint information is added to the fingerprint template library as an unmatched type of fingerprint template.

In an implementation, when the number of fingerprint templates in the fingerprint template library reaches the preset threshold number, the terminal may acquire the moments when the unmatched type of fingerprint templates are added to the fingerprint template library, and may further delete an unmatched type of fingerprint template that is added at the earliest moment from the current moment from the fingerprint template library and add the first fingerprint information to the fingerprint template library as an unmatched type of fingerprint template. That is, for the case where the fingerprint template library includes a pre-recorded fingerprint template, an matched type of fingerprint template, and an unmatched type of fingerprint template, there is no fingerprint template whose matching degree with the first fingerprint information is greater than the first preset threshold in the fingerprint template library, there is a fingerprint template whose matching degree with the first fingerprint information is greater than the second preset threshold in the fingerprint template library, and the number of fingerprint templates in the fingerprint template library reaches the preset threshold number, the terminal may preferentially delete the earliest added unmatched type of fingerprint template, and preserve the pre-recorded fingerprint template and the matched type of fingerprint template already converted.

In step 103, when there is a fingerprint template whose fingerprint matching degree with the first fingerprint information is greater than the first preset threshold in the fingerprint template library, the preset action is performed.

In an implementation, when there is a fingerprint template (which may be referred to as a second fingerprint template) whose matching degree with the first fingerprint information is greater than the first preset threshold in the fingerprint template library, the terminal may perform the preset action.

The second fingerprint template may be any template in the fingerprint template library, i.e., any template among the pre-recorded fingerprint templates, the unmatched type of fingerprint templates added during the identification process and the matched type of fingerprint templates converted from the unmatched type of fingerprint templates.

In addition, when calculating the matching degree between the first fingerprint information and each fingerprint template in the fingerprint template library, the terminal may calculate the matching degree between the first fingerprint information and each fingerprint template one by one. For the case where the fingerprint template library includes a pre-recorded fingerprint template, a matched type of fingerprint template converted from an unmatched type of fingerprint template, and an unmatched type of fingerprint template, the terminal may sequentially calculate the matching degree between the first fingerprint information and each fingerprint template according to an order of the pre-recorded fingerprint template, the matched type of fingerprint template converted from an unmatched type of fingerprint template, and the unmatched type of fingerprint template. Whenever a matching degree is calculated, it may be compared with the first preset threshold. When the matching degree between a fingerprint template and the first fingerprint information is greater than the first preset threshold, the terminal may no longer calculate the matching degrees between the remaining fingerprint templates and the first fingerprint information.

Additionally, the terminal may terminate the fingerprint identification procedure after performing the preset action. After the fingerprint identification procedure is terminated, the terminal may not acquire the fingerprint information any longer when a user's finger touches the fingerprint detection component again. In this way, for the case where the fingerprint detection component is provided with a home button, the terminal can receive the touch event by the user on the home button during working by terminating the fingerprint identification procedure after the preset action is performed, thereby performing the processing corresponding to the touch event.

In some embodiments, for the case where the matching degree between the first fingerprint information and the second fingerprint template in the fingerprint template library is greater than the first preset threshold, correspondingly, the terminal may also perform the following processing: when the fingerprint template whose matching degree with the first fingerprint information in the fingerprint template library is greater than the first preset threshold is an unmatched type of fingerprint template, then the fingerprint template whose matching degree with the first fingerprint information is greater than the first preset threshold is converted into a matched type of fingerprint template.

In an implementation, when the matching degree between the first fingerprint information and the second fingerprint template is greater than the first preset threshold, the terminal may further determine whether the second fingerprint template is an unmatched type of fingerprint template, and when the second fingerprint template is an unmatched type of fingerprint template, the terminal may convert the second fingerprint template into a matched type of fingerprint template. That is, for each unmatched type of fingerprint template in the fingerprint template library, when the terminal again acquires fingerprint information whose matching degree with the unmatched type of fingerprint template is greater than the first preset threshold during the usage of the terminal, the unmatched type of fingerprint template can be converted into a matched template.

In some embodiments, for the case where the matching degree between the first fingerprint information and the second fingerprint template in the fingerprint template library is greater than the first preset threshold, the terminal may also update the second fingerprint template. Accordingly, the terminal further perform the following processing: determining partial fingerprint information in the first fingerprint information which is beyond the fingerprint template whose matching degree with the first fingerprint information is greater than the first preset threshold; and adding the partial fingerprint information to the fingerprint template whose matching degree with the first fingerprint is greater than the first preset threshold.

Figure 2:
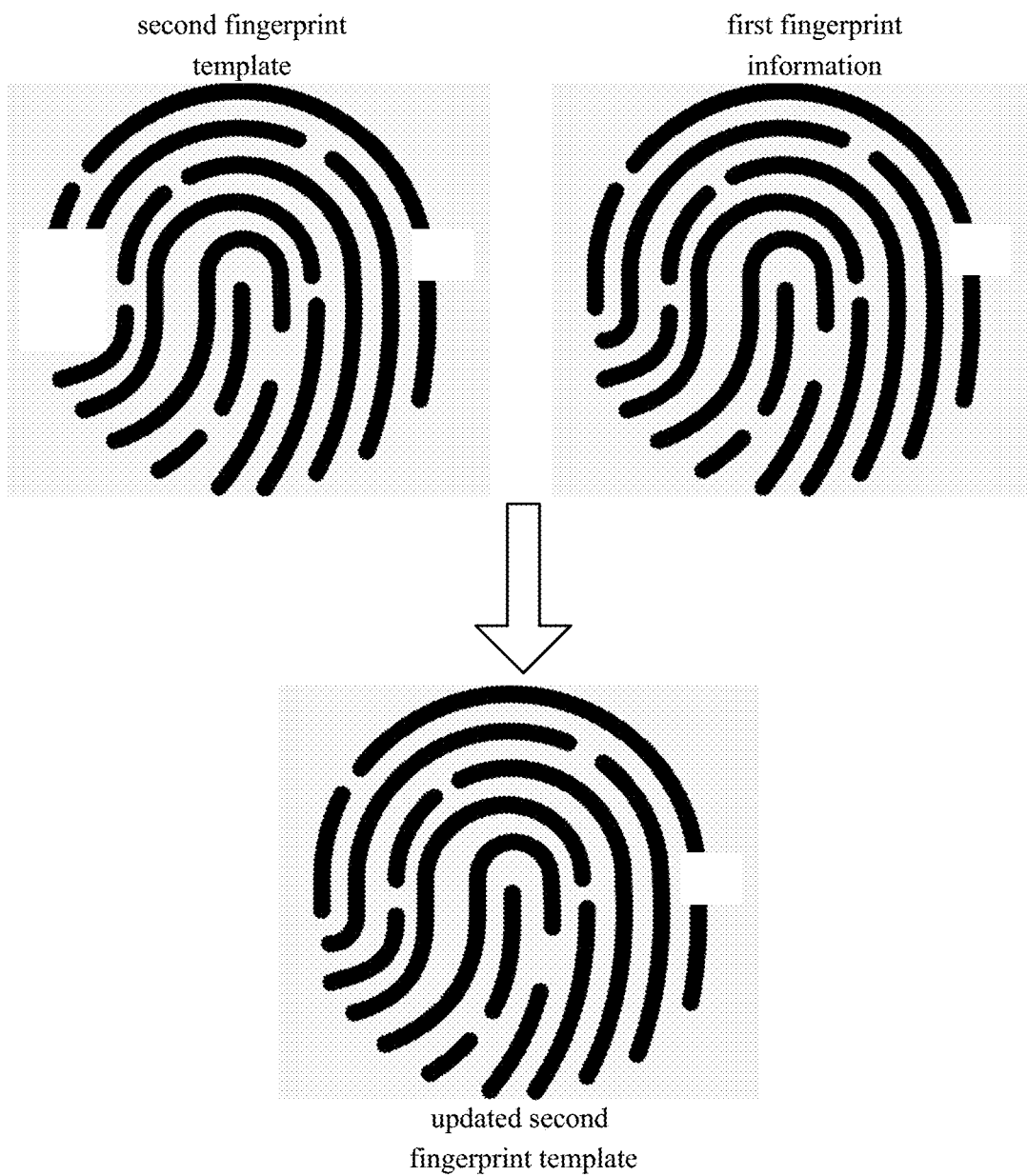
FIG. 2 is a schematic diagram of updating a fingerprint template shown in accordance with an aspect of the disclosure.

In an implementation, when the matching degree between the first fingerprint information and the second fingerprint template in the fingerprint template library is greater than the first preset threshold, the terminal may further update the second fingerprint template in addition to performing the preset action. Specifically, the terminal may determine partial fingerprint information in the first fingerprint information which is beyond the fingerprint information in the second fingerprint template, and may further update the determined partial fingerprint information into the second fingerprint template. That is, the partial fingerprint information included in the first fingerprint information may added to a corresponding position in the second fingerprint template. For example, when the partial fingerprint information in the first fingerprint information which is beyond the fingerprint information in the second fingerprint template is fingerprint information of the lower left part of a finger, the terminal may update the fingerprint information of the lower left part of the finger included in the first fingerprint information to the second fingerprint template, as shown in FIG. 2.

In this solution, when the pre-recorded fingerprint template contains partial fingerprint information of a finger and the user inputs another partial fingerprint information of the finger during identification, the terminal may add the fingerprint information acquired this time as an unmatched type of fingerprint template to the fingerprint template library without the user recording the fingerprint template again, thereby improving the efficiency of updating the fingerprint template library. When the user inputs the partial fingerprint information again next time, the terminal may be triggered to perform the preset action. Therefore, the occurrence of failed identification can be avoided when partial fingerprint information of a finger is included in the pre-recorded fingerprint template and the user inputs another partial fingerprint information of the finger during identification. At the same time, the unmatched type of fingerprint template can be converted into a matched type of fingerprint template to prevent the fingerprint template from being deleted when the number of fingerprint templates in the fingerprint template library reaches a preset threshold.

In the embodiments of the present disclosure, when the verification trigger event corresponding to the preset action is detected, the currently input first fingerprint information is acquired by the fingerprint detection component. When there is no fingerprint template in the fingerprint template library whose matching degree with the first fingerprint information is greater than the first preset threshold, and there is a fingerprint template whose matching degree with the first fingerprint information is greater than the second preset threshold in the fingerprint template library, the first fingerprint information is added to the fingerprint template library as an unmatched type of fingerprint template. The fingerprint template library includes at least two types of fingerprint templates. When there is a fingerprint template in the fingerprint template library whose matching degree with the first fingerprint information is greater than the first preset threshold, the preset action is performed. In this way, whenever the fingerprint information input by a user does not match up with any fingerprint template in the fingerprint template library, the terminal may add it to the fingerprint template library as an unmatched type of fingerprint template. Thus, when the user inputs the fingerprint information again, the terminal can be triggered to perform the corresponding processing, thereby preventing processing failure.

Figure 3:
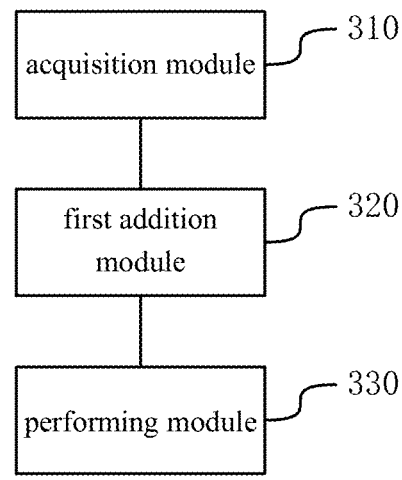
FIG. 3 is a schematic diagram of an apparatus for performing a processing shown in accordance with an aspect of the disclosure.

An aspect of the disclosure of the present disclosure provides an apparatus for processing fingerprint. As shown in FIG. 3, the apparatus may include: an acquisition module 310 configured to acquire currently input first fingerprint information by a fingerprint detection component when a verification trigger event corresponding to a preset action is detected; a first addition module 320 configured to add the first fingerprint information to a fingerprint template library as an unmatched type of fingerprint template when there is no fingerprint template whose matching degree with the first fingerprint information is greater than a first preset threshold in the fingerprint template library and there is a fingerprint template whose matching degree with the first fingerprint information is greater than a second preset threshold in fingerprint template library, where the fingerprint template library comprises at least two types of fingerprint templates and the first preset threshold is greater than the second preset threshold; and a performing module 330 configured to perform the preset action when there is a fingerprint template whose matching degree with the first fingerprint information is greater than the first preset threshold in the fingerprint template library. Here, the acquisition module 310, the first addition module 320, and the performing module 330 may be implemented at least partially using one or more integrated circuits or other hardware components.

Figure 4:
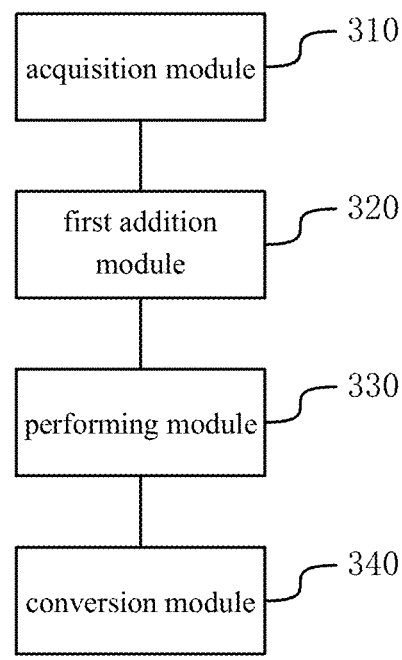
FIG. 4 is a schematic diagram of an apparatus for performing a processing shown in accordance with an aspect of the disclosure.

In some embodiments, as shown in FIG. 4, the apparatus further includes: a conversion module 340 configured to convert the fingerprint template whose matching degree with the first fingerprint information is greater than the first preset threshold into a matched type of fingerprint template when the fingerprint template whose matching degree with the first fingerprint information is greater than the first preset threshold in the fingerprint template library is an unmatched type of fingerprint template.

In some embodiments, the first addition module 320 is configured to: add the first fingerprint information to the fingerprint template library as the unmatched type of fingerprint template when there is no fingerprint template whose matching degree with the first fingerprint information is greater than the first preset threshold in the fingerprint template library, there is the fingerprint template whose matching degree with the first fingerprint information is greater than the second preset threshold in the fingerprint template library and the number of fingerprint templates in the fingerprint template library is less than a preset threshold number.

In some embodiments, the first addition module 320 is configured to: delete an earliest added unmatched type of fingerprint template from the fingerprint template library, and add the first fingerprint information as the unmatched type of fingerprint template to the fingerprint template library when there is no fingerprint template whose matching degree with the first fingerprint information is greater than the first preset threshold in the fingerprint template library, there is the fingerprint template whose matching degree with the first fingerprint information is greater than the second preset threshold in the fingerprint template library, and the number of fingerprint templates in the fingerprint template library reaches the preset threshold number.

Figure 5:
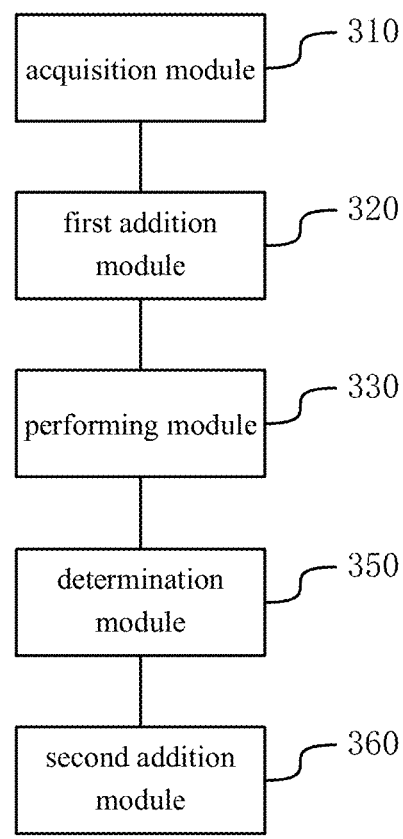
FIG. 5 is a schematic diagram of an apparatus for performing a processing shown in accordance with an aspect of the disclosure.

In some embodiments, as shown in FIG. 5, the apparatus further includes: a determination module 350 configured to determine partial fingerprint information in the first fingerprint information that is beyond the fingerprint template whose matching degree with the first fingerprint information is greater than the first preset threshold; and a second addition module 360 configured to add the partial fingerprint information to the fingerprint template whose matching degree with the first fingerprint information is greater than the first preset threshold.

In some embodiments, the preset action comprises a screen unlocking process.

With respect to the apparatus of the above embodiment, the specific method of operation performed by each module has been described in details in the embodiment of the method, and the description thereof may not be described in details herein.

In the embodiments of the present disclosure, when the verification trigger event corresponding to the preset action is detected, the currently input first fingerprint information is acquired by the fingerprint detection component. When there is no fingerprint template in the fingerprint template library whose matching degree with the first fingerprint information is greater than the first preset threshold, and there is a fingerprint template whose matching degree with the first fingerprint information is greater than the second preset threshold in the fingerprint template library, the first fingerprint information is added to the fingerprint template library as an unmatched type of fingerprint template. The fingerprint template library includes at least two types of fingerprint templates. When there is a fingerprint template in the fingerprint template library whose matching degree with the first fingerprint information is greater than the first preset threshold, the preset action is performed. In this way, whenever the fingerprint information input by a user does not match up with any fingerprint template in the fingerprint template library, the terminal may add it to the fingerprint template library as an unmatched type of fingerprint template. Thus, when the user inputs the fingerprint information again, the terminal can be triggered to perform the corresponding processing, thereby preventing processing failure.

It should be noted that the apparatus for processing fingerprint provided by the above embodiment is exemplified only by the above division of each of the functional modules when processing fingerprint. In practice, the above-described functions may be assigned and completed by different functional modules in accordance with requirements, such that the internal structure of the terminal can be divided into different functional modules to complete all or part of the functions described above. In addition, the apparatus and the method for processing fingerprint provided in the above embodiments follow the same principal, and the specific implementation process thereof can be described in the method embodiment and may not be described again hereto.

A structural schematic diagram of a terminal 600 is shown in yet another aspect of the disclosure of the present disclosure. The terminal 600 may be a mobile phone, a tablet computer, a digital broadcast device, a messaging device, a personal digital assistant and the like.

Figure 6:
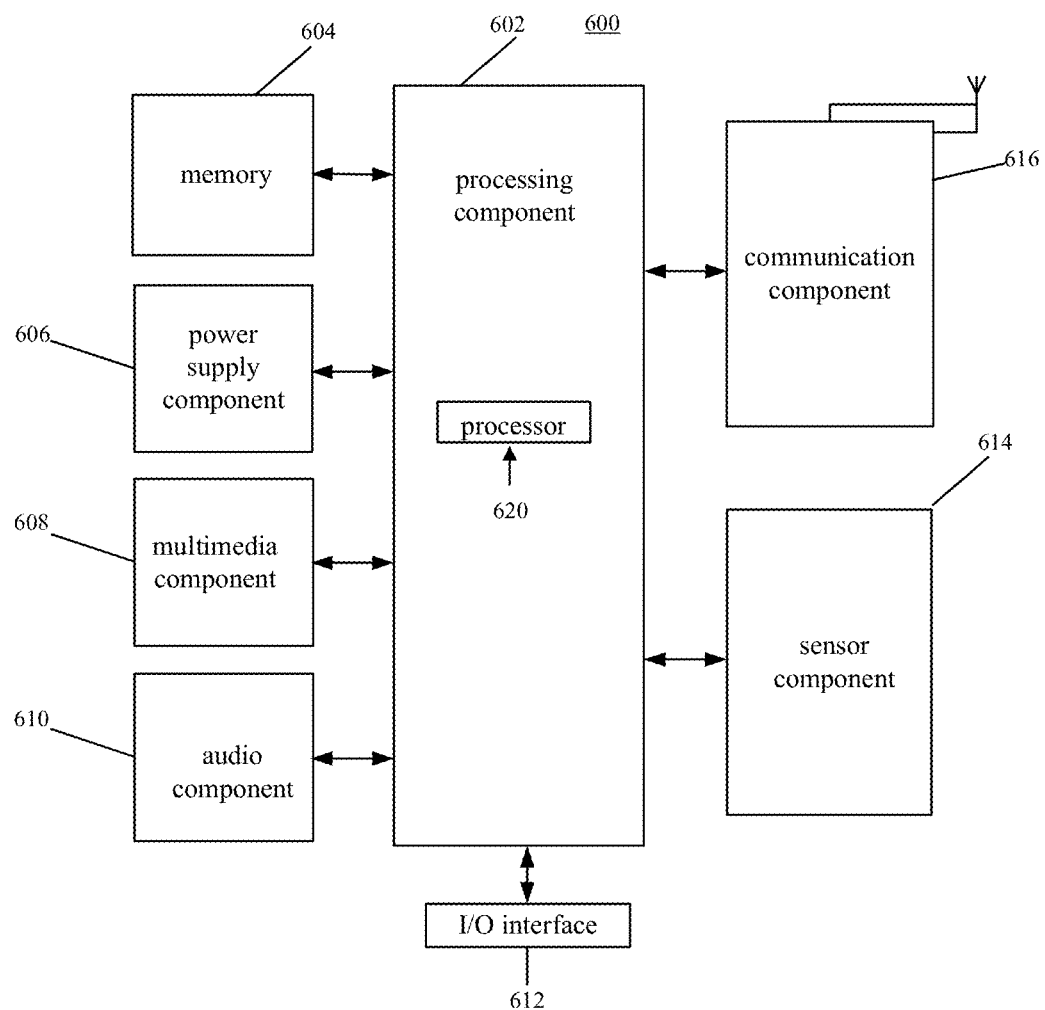
FIG. 6 is a structural schematic diagram of a terminal shown in accordance with an aspect of the disclosure.

Referring to FIG. 6, the terminal 600 may include one or more of the following components: a processing component 602, a memory 604, a power supply component 606, a multimedia component 608, an audio component 610, an input/output (I/O) interface 612, a sensor component 614, and a communication component 616.

The processing component 602 generally can control the overall operation of the terminal 600, such as operations associated with display, phone call, data communication, camera operation, and recording operation. The processing component 602 may include one or more processors 620 to execute instructions, to complete all or part of the steps described above. In addition, the processing component 602 may include one or more modules to facilitate the interactions between the processing component 602 and other components. For example, the processing component 602 may include a multimedia module to facilitate interaction between the multimedia component 608 and the processing component 602.

The memory 604 can be configured to store various types of data to support the operation of the terminal 600. Examples of such data can include instructions of any application or method operating on the terminal 600, contact data, phonebook data, messages, pictures, videos, and the like. The memory 604 may be implemented by any type of volatile or nonvolatile memory device or a combination thereof, such as static random access memory (SRAM), electrically erasable programmable read only memory (EEPROM), erasable programmable read only memory (EPROM), programmable read only memory (PROM), read only memory (ROM), magnetic memory, flash memory, disk or CD.

The power supply component 606 can provide power to the various components of the terminal 600. The power supply component 606 may include a power management system, one or more power supplies, and other components associated with generating, managing, and distributing power for the terminal 600.

The multimedia component 608 may include a screen providing an output interface between the terminal 600 and the user. In some embodiments, the screen may include a liquid crystal display (LCD) and a touch panel (TP). If the screen includes a touch panel, the screen may be implemented as a touch screen to receive input signals from the user. The touch panel can include one or more touch sensors to sense touches, slides, and gestures on touch panels. The touch sensors may sense not only the boundary of the touch or slide actions, but also the duration and pressure associated with the touch or slide operation. In some embodiments, the multimedia component 608 may include a front camera and/or a rear camera. When the terminal 600 is at an operating mode, such as a shooting mode or a video mode, the front camera and/or the rear camera can receive external multimedia data. Each front camera and rear camera can be a fixed optical lens system or have focal length and optical zoom capability.

The audio component 610 can be configured to output and/or input an audio signal. For example, the audio component 610 can include a microphone (MIC) that is configured to receive external audio signals when the terminal 600 is in the operating mode, such as a call mode, a recording mode, and a voice recognition mode. The received audio signals may be further stored in the memory 604 or transmitted via the communication component 616. In some embodiments, the audio component 610 can also include a speaker for outputting the audio signals.

The I/O interface 612 can provide the interface between the processing component 602 and a peripheral interface module, the peripheral interface module may be a keyboard, a mouse, buttons, or the like. The buttons may include, but are not limited to, a home button, a volume button, a start button, and a lock button.

The sensor component 614 may include one or more sensors for providing condition assessments of the various aspects of the terminal 600. For example, the sensor component 614 may detect the on/off state of the terminal 600, the relative positioning of the components, such as the components can be the display and keypad of the terminal 600, and the sensor component 614 may also detect position changes of the terminal 600 or any component thereof, presence or absence of the user contact with the terminal 600, orientation, acceleration/deceleration, or the temperature changes of the terminal 600. The sensor component 614 may include a proximity sensor configured to detect the presence of a nearby object without any physical contact. The sensor component 614 may also include a light sensor, such as a CMOS or CCD image sensor, for imaging applications. In some embodiments, the sensor component 614 may also include acceleration sensors, gyro sensors, magnetic sensors, pressure sensors, or temperature sensors.

The communication component 616 can be configured to facilitate wired or wireless communication between the terminal 600 and other apparatuses. The terminal 600 may access a wireless network based on a communication standard, such as WiFi, 2G or 3G, or a combination thereof. In an aspect of the disclosure, the communication component 616 can receive broadcast signals or broadcast-related information from an external broadcast management system via broadcast channels. In an aspect of the disclosure, the communication component 616 can also include a near field communication (NFC) module to facilitate short-range communication. For example, the NFC module may be implemented based on radio frequency identification (RFID) technology, infrared data association (IrDA) technology, ultra wideband (UWB) technology, Bluetooth (BT) technology and other techniques.

In an aspect of the disclosure, the terminal 600 may be implemented by one or more application specific integrated circuits (ASICs), digital signal processors (DSPs), digital signal processing devices (DSPDs), programmable logic devices (PLDs), field programmable gate array (FPGA), a controller, a microcontroller, a microprocessor, or other electronic components for performing the method for processing fingerprint described above.

In an aspect of the disclosure, there is also provided a non-transitory computer-readable storage medium comprising instructions, such as the memory 604 including the instructions. The instructions may be executed by the processor 620 of the terminal 600 to complete the method for processing fingerprint described above. For example, the non-transitory computer-readable storage medium may be a ROM, a random access memory (RAM), a CD-ROM, a magnetic tape, a floppy disk, an optical data storage device, etc.

In an aspect of the disclosure, there is further provided a computer-readable storage medium comprising computer programs, for example, ROM, RAM, CD-ROM, magnetic tape, floppy disk, optical data storage device and the like. At least an instruction, a program, a code set or instruction set stored in the storage medium, when executed by the processor of the terminal, causes the terminal to perform the method for processing fingerprint in the above embodiments. The method includes: acquiring currently input first fingerprint information by a fingerprint detection component when a verification trigger event corresponding to a preset action is detected; adding the first fingerprint information to a fingerprint template library as an unmatched type of fingerprint template when there is no fingerprint template whose matching degree with the first fingerprint information is greater than a first preset threshold in the fingerprint template library and there is a fingerprint template whose matching degree with the first fingerprint information is greater than a second preset threshold in fingerprint template library, where the fingerprint template library comprises at least two types of fingerprint templates and the first preset threshold is greater than the second preset threshold; and performing the preset action when there is a fingerprint template whose matching degree with the first fingerprint information is greater than the first preset threshold in the fingerprint template library.

In some embodiments, the at least an instruction, a program, a code set or instruction set stored in the storage medium may be loaded and executed by the processor to perform acts including: converting the fingerprint template whose matching degree with the first fingerprint information is greater than the first preset threshold into a matched type of fingerprint template when the fingerprint template whose matching degree with the first fingerprint information is greater than the first preset threshold in the fingerprint template library is an unmatched type of fingerprint template.

In some embodiments, the at least an instruction, a program, a code set or instruction set stored in the storage medium may be loaded and executed by the processor to perform acts including: adding the first fingerprint information to the fingerprint template library as the unmatched type of fingerprint template when there is no fingerprint template whose matching degree with the first fingerprint information is greater than the first preset threshold in the fingerprint template library, there is the fingerprint template whose matching degree with the first fingerprint information greater than the second preset threshold in the fingerprint template library and the number of fingerprint templates in the fingerprint template library is less than a preset threshold number.

In some embodiments, the at least an instruction, a program, a code set or instruction set stored in the storage medium may be loaded and executed by the processor to perform acts including: deleting an earliest added unmatched type of fingerprint template from the fingerprint template library, and adding the first fingerprint information as the unmatched type of fingerprint template to the fingerprint template library when there is no fingerprint template whose matching degree with the first fingerprint information is greater than the first preset threshold in the fingerprint template library, there is the fingerprint template whose matching degree with the first fingerprint information greater than the second preset threshold in the fingerprint template library, and the number of fingerprint templates in the fingerprint template library reaches the preset threshold number.

In some embodiments, the at least an instruction, a program, a code set or instruction set stored in the storage medium may be loaded and executed by the processor to perform acts including: determining partial fingerprint information in the first fingerprint information that is beyond the fingerprint template whose matching degree with the first fingerprint information is greater than the first preset threshold; and adding the partial fingerprint information to the fingerprint template whose matching degree with the first fingerprint information is greater than the first preset threshold.

In some embodiments, the preset action includes a screen unlocking process.

In the embodiments of the present disclosure, when the verification trigger event corresponding to the preset action is detected, the currently input first fingerprint information is acquired by the fingerprint detection component. When there is no fingerprint template in the fingerprint template library whose matching degree with the first fingerprint information is greater than the first preset threshold, and there is a fingerprint template whose matching degree with the first fingerprint information is greater than the second preset threshold in the fingerprint template library, the first fingerprint information is added to the fingerprint template library as an unmatched type of fingerprint template. The fingerprint template library includes at least two types of fingerprint templates. When there is a fingerprint template in the fingerprint template library whose matching degree with the first fingerprint information is greater than the first preset threshold, the preset action is performed. In this way, whenever the fingerprint information input by a user does not match up with any fingerprint template in the fingerprint template library, the terminal may add it to the fingerprint template library as an unmatched type of fingerprint template. Thus, when the user inputs the fingerprint information again, the terminal can be triggered to perform the corresponding processing, thereby preventing processing failure.

Other embodiments of the present disclosure can be available to those skilled in the art upon consideration of the specification and practice of the present disclosure herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

It's to be understood that this disclosure is not limited to the precise constructions described above and shown in the enclosed drawings, and various modifications and changes may be made without departing from the scope thereof. The scope of the present disclosure can be limited only by the appended claims.

What is claimed is:

1. A method for processing fingerprint, comprising:
acquiring currently input first fingerprint information by a fingerprint detection component when a verification trigger event corresponding to a preset action is detected;
adding the first fingerprint information to a fingerprint template library as an unmatched type of fingerprint template when there is no fingerprint template whose matching degree with the first fingerprint information is greater than a first preset threshold in the fingerprint template library and there is a fingerprint template whose matching degree with the first fingerprint information is greater than a second preset threshold in fingerprint template library,
wherein the fingerprint template library comprises at least two types of fingerprint templates with one of the at least two types being the unmatched type, wherein the first preset threshold is greater than the second preset threshold, and
wherein the first preset threshold and the second preset threshold are both for comparing the matching degree between the first fingerprint information and the fingerprint templates in the fingerprint template library; and performing the preset action when there is a fingerprint template whose matching degree with the first fingerprint information is greater than the first preset threshold in the fingerprint template library.

2. The method according to claim 1, further comprising: converting the fingerprint template whose matching degree with the first fingerprint information is greater than the first preset threshold into a matched type of fingerprint template when the fingerprint template whose matching degree with the first fingerprint information is greater than the first preset threshold in the fingerprint template library is an unmatched type of fingerprint template.

3. The method according to claim 2, wherein when there is no fingerprint template whose matching degree with the first fingerprint information is greater than the first preset threshold in the fingerprint template library, and there is the fingerprint template whose matching degree with the first fingerprint information is greater than the second preset threshold in the fingerprint template library, adding the first fingerprint information to the fingerprint template library as the unmatched type of fingerprint template comprises:

adding the first fingerprint information to the fingerprint template library as the unmatched type of fingerprint template when there is no fingerprint template whose matching degree with the first fingerprint information is greater than the first preset threshold in the fingerprint template library, there is the fingerprint template whose matching degree with the first fingerprint information is greater than the second preset threshold in the fingerprint template library and the number of fingerprint templates in the fingerprint template library is less than a preset threshold number.

4. The method according to claim 2, wherein when there is no fingerprint template whose matching degree with the first fingerprint information is greater than the first preset threshold in the fingerprint template library, and there is the fingerprint template whose matching degree with the first fingerprint information is greater than the second preset threshold in the fingerprint template library, adding the first fingerprint information to the fingerprint template library as the unmatched type of fingerprint template comprises:

deleting an earliest added unmatched type of fingerprint template from the fingerprint template library, and adding the first fingerprint information as the unmatched type of fingerprint template to the fingerprint template library when there is no fingerprint template whose matching degree with the first fingerprint information is greater than the first preset threshold in the fingerprint template library, there is the fingerprint template whose matching degree with the first fingerprint information is greater than the second preset threshold in the fingerprint template library, and the number of fingerprint templates in the fingerprint template library reaches the preset threshold number.

5. The method according to claim 2, wherein the at least two types of fingerprint templates comprise:

a pre-recorded fingerprint template, an unmatched type of fingerprint template added in the identification process, and a matched type of fingerprint template converted from the unmatched type of fingerprint template.

6. The method according to claim 1, further comprising: determining partial fingerprint information in the first fingerprint information that is beyond the fingerprint template whose matching degree with the first fingerprint information is greater than the first preset threshold; and adding the partial fingerprint information to the fingerprint template whose matching degree with the first fingerprint information is greater than the first preset threshold.

7. The method according to claim 1, wherein the preset action comprises a screen unlocking process.

8. The method according to claim 7, wherein the verification trigger event corresponding to the screen unlocking process preset in the terminal being an event of touching the fingerprint detection component in the screen-locked state.

9. A terminal, comprising:
a processor; and
a memory configured to store executable instructions executed by the processor;
wherein the processor is configured to:
acquire currently input first fingerprint information by a fingerprint detection component when a verification trigger event corresponding to a preset action is detected;
add the first fingerprint information to a fingerprint template library as an unmatched type of fingerprint template when there is no fingerprint template whose matching degree with the first fingerprint information is greater than a first preset threshold in the fingerprint template library and there is a fingerprint template whose matching degree with the first fingerprint information is greater than a second preset threshold in fingerprint template library, wherein the fingerprint template library comprises at least two types of fingerprint templates with one of the at least two types being the unmatched type, wherein the first preset threshold is greater than the second preset threshold, and wherein the first preset threshold and the second preset threshold are both for comparing the matching degree between the first fingerprint information and the fingerprint templates in the fingerprint template library; and
perform the preset action when there is a fingerprint template whose matching degree with the first fingerprint information is greater than the first preset threshold in the fingerprint template library.

10. The terminal according to claim 9, wherein the processor is further configured to:
convert the fingerprint template whose matching degree with the first fingerprint information is greater than the first preset threshold into a matched type of fingerprint template when the fingerprint template whose matching degree with the first fingerprint information is greater than the first preset threshold in the fingerprint template library is an unmatched type of fingerprint template.

11. The terminal according to claim 10, wherein the processor is further configured to:
add the first fingerprint information to the fingerprint template library as the unmatched type of fingerprint template when there is no fingerprint template whose matching degree with the first fingerprint information is greater than the first preset threshold in the fingerprint template library, there is the fingerprint template whose matching degree with the first fingerprint information is greater than the second preset threshold in the fingerprint template library and the number of fingerprint templates in the fingerprint template library is less than a preset threshold number.

12. The terminal according to claim 10, wherein the processor is further configured to:
   delete an earliest added unmatched type of fingerprint template from the fingerprint template library, and add the first fingerprint information as the unmatched type of fingerprint template to the fingerprint template library when there is no fingerprint template whose matching degree with the first fingerprint information is greater than the first preset threshold in the fingerprint template library, there is the fingerprint template whose matching degree with the first fingerprint information is greater than the second preset threshold in the fingerprint template library, and the number of fingerprint templates in the fingerprint template library reaches the preset threshold number.

13. The terminal according to claim 9, wherein the processor is further configured to:
   determine partial fingerprint information in the first fingerprint information that is beyond the fingerprint template whose matching degree with the first fingerprint information is greater than the first preset threshold; and
   add the partial fingerprint information to the fingerprint template whose matching degree with the first fingerprint information is greater than the first preset threshold.

14. The terminal according to claim 9, wherein the preset action comprises a screen unlocking process.

15. A non-transitory computer-readable storage medium, comprising at least an instruction, a program, a code set, or instruction set loaded and executed by a processor to perform act comprising:
   acquiring currently input first fingerprint information by a fingerprint detection component when a verification trigger event corresponding to a preset action is detected;
   adding the first fingerprint information to a fingerprint template library as an unmatched type of fingerprint template when there is no fingerprint template whose matching degree with the first fingerprint information is greater than a first preset threshold in the fingerprint template library and there is a fingerprint template whose matching degree with the first fingerprint information is greater than a second preset threshold in fingerprint template library, wherein the fingerprint template library comprises at least two types of fingerprint templates with one of the at least two types being the unmatched type, wherein the first preset threshold is greater than the second preset threshold, and wherein the first preset threshold and the second preset threshold are both for comparing the matching degree between the first fingerprint information and the fingerprint templates in the fingerprint template library; and
   performing the preset action when there is a fingerprint template whose matching degree with the first fingerprint information is greater than the first preset threshold in the fingerprint template library.

16. The non-transitory computer-readable storage medium according to claim 15, wherein the acts further comprise:
   converting the fingerprint template whose matching degree with the first fingerprint information is greater than the first preset threshold into a matched type of fingerprint template when the fingerprint template whose matching degree with the first fingerprint information is greater than the first preset threshold in the fingerprint template library is an unmatched type of fingerprint template.

17. The non-transitory computer-readable storage medium according to claim 16, wherein the acts further comprise:
   adding the first fingerprint information to the fingerprint template library as the unmatched type of fingerprint template when there is no fingerprint template whose matching degree with the first fingerprint information is greater than the first preset threshold in the fingerprint template library, there is the fingerprint template whose matching degree with the first fingerprint information is greater than the second preset threshold in the fingerprint template library and the number of fingerprint templates in the fingerprint template library is less than a preset threshold number.

18. The non-transitory computer-readable storage medium according to claim 16, wherein the acts further comprise:
   deleting an earliest added unmatched type of fingerprint template from the fingerprint template library, and adding the first fingerprint information as the unmatched type of fingerprint template to the fingerprint template library when there is no fingerprint template whose matching degree with the first fingerprint information is greater than the first preset threshold in the fingerprint template library, there is the fingerprint template whose matching degree with the first fingerprint information is greater than the second preset threshold in the fingerprint template library, and the number of fingerprint templates in the fingerprint template library reaches the preset threshold number.

19. The non-transitory computer-readable storage medium according to claim 15, wherein the acts further comprise:
   determining partial fingerprint information in the first fingerprint information that is beyond the fingerprint template whose matching degree with the first fingerprint information is greater than the first preset threshold; and
   adding the partial fingerprint information to the fingerprint template whose matching degree with the first fingerprint information is greater than the first preset threshold.

20. The non-transitory computer-readable storage medium according to claim 15, wherein the preset action comprises a screen unlocking process.

* * * * *